(No Model.)
C. EICKEMEYER.
MULTIPLYING GEAR FOR BICYCLES.
No. 601,507.　　　　　Patented Mar. 29, 1898.
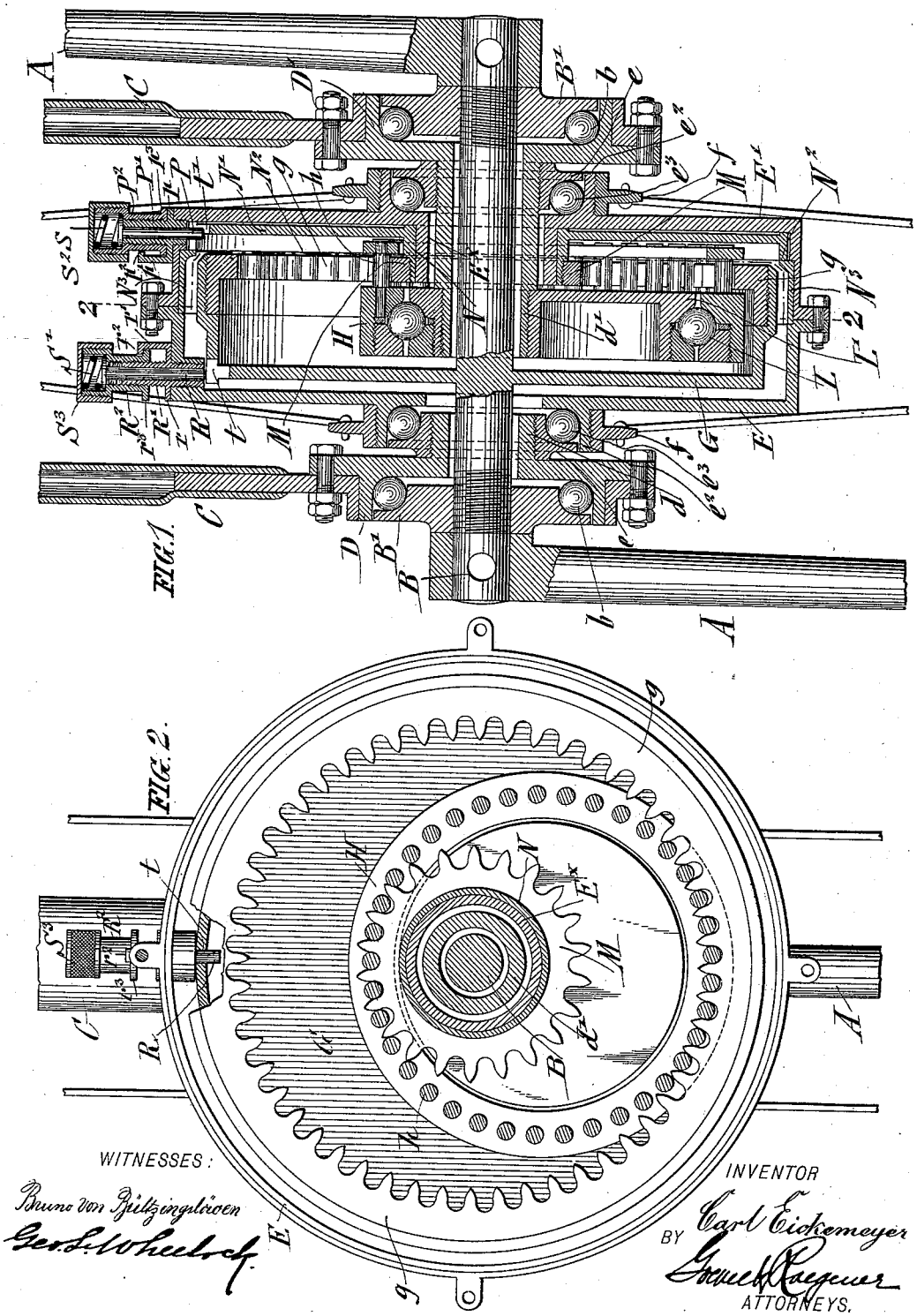
WITNESSES:
Bruno von Bitzingsloven
Geo. S. Wheelock
INVENTOR
Carl Eickemeyer
BY
ATTORNEYS.

UNITED STATES PATENT OFFICE.

CARL EICKEMEYER, OF YONKERS, NEW YORK.

MULTIPLYING-GEAR FOR BICYCLES.

SPECIFICATION forming part of Letters Patent No. 601,507, dated March 29, 1898.

Application filed September 25, 1897. Serial No. 652,973. (No model.)

*To all whom it may concern:*

Be it known that I, CARL EICKEMEYER, a citizen of the United States, residing at Yonkers, in the county of Westchester and State of New York, have invented certain new and useful Improvements in Multiplying-Gears for Bicycles, of which the following is a specification.

This invention relates to a multiplying-gear for bicycles which can be operated quickly and in the manner in which all speed-changing devices should be operated—that is to say, with the rider off of the machine—by simply calling into action one of several locking devices which engage different portions of the gear—that is to say, respectively with a spur-wheel on the crank-shaft or a part thereof and with a gear-wheel forming a portion of the gearing interposed between the spur-wheel and the hub.

The present speed-changing device is simple, practical, and durable and does not require the operation of disengaging one set of gears and engaging another, clutch devices, or other complicated mechanism common in other speed-changing devices, in which when the driving-gear is disengaged with the driven axle the rider loses partial control of the machine, at which time a liability to accident is at once introduced.

My invention consists of a crank-axle journaled in suitable bearings of the main frame of the bicycle, a toothed or spur wheel fixed to the crank-axle, multiplying-gears engaged by said spur-wheel, a disk attached to one of the multiplying-gears, and locking devices, one of which is adapted to engage with said spur-wheel for locking the hub directly to the axle and the other of which is adapted to engage with said disk for increasing the rate of rotation of the driving-wheel, as will be described hereinafter and then particularly claimed.

In the accompanying drawings, Figure 1 is a transverse section in line with the crank-axle through the operative and adjacent parts of my improved multiplying-gear; and Fig. 2 is a section on line 2 2, Fig. 1, the stop-ring for the rotary disk being removed and a portion of the spur-wheel being broken out.

Similar letters of reference indicate corresponding parts.

Referring to the drawings, A indicates the cranks of the pedals of the bicycle, and B the crank-axle. Disks $B'$ are screwed onto each end of the crank-axle, while rings $D\ D'$ are secured to the forked frame C of the bicycle in any suitable manner, said disks and rings being provided with annular grooves for receiving a series of balls $b$, and said rings $D\ D'$ being provided with inwardly-extending neck portions $d\ d'$. Screw-nuts $e$ are screwed onto the threaded exteriors of the necks $d\ d'$, and between the same and the hub is arranged a series of balls $e^3$, running in annular grooves in said parts. The hub consists of two sections $E\ E'$, suitably connected together at their peripheries so as to inclose the gearing. It is preferred to connect the spokes with screw-threaded rings $f$, which are screwed onto the threaded annular flanges $e^2$ of the hub. A spur or gear wheel is fixed to the crank-shaft, said spur-wheel being preferably composed of a web G, having an internally-screw-threaded annular flange, into which is screwed an externally-screw-threaded ring $g$, provided with internal teeth.

H indicates a gear-wheel, preferably of the form of a crown or lantern wheel, said gear-wheel being suitably constructed to provide an internal annular groove to provide a way for an annular series of balls L, which also run in an annular groove or way formed in a suitably-constructed circular piece or support $L'$, which is fixed to the neck $d'$ of the axis-box $D\ D'$. A star-wheel M is arranged so that its teeth intermesh with the teeth $h$ of the gear-wheel H, said star-wheel having a screw-threaded opening, so that the same can screw onto the neck N of a disk $N'$, said star-wheel M and disk $N'$ having bearing on the boss $E^\times$, which projects inwardly from the section $E'$ of the hollow hub. The disk $N'$ is provided on its outer edge with a flange $N^2$, and the axial motion of said disk is prevented in one direction by the section $E'$ of the hub, while in the other direction it is prevented by means of a stop-ring $N^3$, which is clamped within the shouldered portions of the respective sections of the hub.

It is evident that if the spur or gear wheel G were locked directly to the hub the driving-wheel would be carried around at the same rate of speed as the crank-shaft B, while if the disk N' be connected directly with the hub the driving-wheel would be turned faster than the crank-shaft, this rate depending upon the change in the number of teeth in the gearing, or by otherwise changing the intermeshing parts so that a different ratio can be produced. I have devised the following locking means to accomplish this purpose:

Arranged at the sides of the periphery of the hollow hub E E' are locking-pins P R, respectively, said pins being guided in sleeves P' R', the lower ends of which are screw-threaded so as to screw into the hollow hub, and their upper ends being screw-threaded so as to receive internally-threaded cylinders $P^2$ $R^2$. The fixed sleeves P' and R' are provided with annular flanges $p$ and $r$, which in turn are provided with projections $p'$ and $r'$, respectively, having stops $p^2$ and $r^2$, which are adapted to engage with annular flanges $p^3$ and $r^3$, respectively, of the cylinders $P^2$ $R^2$. The cylinders $P^2$ and $R^2$ are each constructed with internal shoulders, with which the heads of the locking-pins are adapted to engage, said heads being normally forced against said shoulders by means of helical springs S and S', respectively, inclosed in the enlarged upper ends of the cylinders $P^2$ and $R^2$, said springs being confined and retained in position by means of internally-screw-threaded caps $S^2$ and $S^3$, which are screwed onto the upper ends of said cylinders. These caps $S^2$ and $S^3$ are knurled or roughened on the outside, so that they may be readily rotated for raising and lowering the same and the cylinder $P^2$ or $R^2$, spring S or S', and locking-pin P or R.

In the spur or gear wheel G $g$ is provided a slot $t$, which is adapted to receive the lower end of the locking-pin R, while in the flange of the disk N is a slot or recess $t'$, which is adapted to receive the lower end of the locking-pin P. By the engagement of the locking-pin R with the spur or gear wheel G $g$ power is transmitted directly from the crank-shaft to the hub, during which time the locking-pin P must be out of engagement, while when pin P is engaged with the disk N' the hub is turned at a greater rate of speed than the crank-shaft, at which time the locking-pin R must be disengaged from the said spur or gear wheel.

The operation of this speed-changing device is as follows: The highest speed is transmitted from the crank-shaft B through the gear G $g$, crown-wheel H, and gear M, and through the disk N', connected with the latter, and the locking-pin P to the hub. Now to change the speed, so that the wheel-hub turns at the same rate as that of the crank-shaft, the locking-pin R is partly screwed down through the medium of the cap and the cylinder $R^2$. The crank-shaft is then turned until the pin R, under the actuation of the spring $S^2$, automatically engages in the recess or slot $t$ of the spur-wheel G $g$, the locking device being then screwed down tight. The locking-pin P is now released from the disk N', which carries the star-wheel M, so that both of said parts are free to turn upon the balls on bearing $E^\times$. To increase the speed, it is evident that the opposite operation has to be performed.

Having thus described my invention, I claim as new and desire to secure by Letters Patent—

1. The combination of the crank-axle provided with a spur-wheel, the hollow hub of the driving-wheel inclosing the spur-wheel, multiplying-gearing intermediate of the spur-wheel and the hub, and locking devices mounted on the hub and adapted to engage either with the spur-wheel or with a portion of the multiplying-gear, for changing the rate of speed, substantially as set forth.

2. The combination of the crank-axle provided with a spur-wheel, having a recess or slot in its periphery, the hub of the driving-wheel inclosing said spur-wheel, multiplying-gear arranged between the spur-wheel and the hub, a portion of the same being also provided with a slot or recess, and locking-pins arranged upon the hub and adapted to be engaged in either of said slots or recesses, substantially as set forth.

3. The combination, of the crank-axle provided with a spur-wheel, a crown or lantern gear-wheel meshing with said spur-wheel, a rotatable disk adapted to turn loosely on a portion of the hub and provided with a star-wheel, meshing with the crown or lantern wheel, a hollow hub inclosing said gearing, and locking devices adapted to interlock with the spur-wheel and with the said disk respectively, substantially as set forth.

4. The herein-described locking device, consisting of a sleeve fixed to the hub and provided with a stop, a cylinder screwed onto said sleeve and provided with a flange adapted to abut against said stop, a spring-actuated locking-pin guided in the sleeve, and a cap screwed onto said cylinder and adapted to retain the spring and locking-pin, substantially as set forth.

In testimony that I claim the foregoing as my invention I have signed my name in presence of two subscribing witnesses.

CARL EICKEMEYER.

Witnesses:
  GEO. EICKEMEYER,
  O. B. WARING.